United States Patent [19]

Holley

[11] Patent Number: 4,479,973
[45] Date of Patent: Oct. 30, 1984

[54] GELLED MILK COMPOSITIONS

[75] Inventor: Edward J. Holley, Banbury, England

[73] Assignee: General Foods Limited, Banbury, England

[21] Appl. No.: 466,984

[22] Filed: Feb. 16, 1983

[51] Int. Cl.³ .................................................. A23L 1/04
[52] U.S. Cl. .............................. 426/573; 426/575/578
[58] Field of Search ............... 426/578, 579, 573, 575, 426/654, 661

[56] References Cited

U.S. PATENT DOCUMENTS

| | | | |
|---|---|---|---|
| 3,507,664 | 4/1970 | Schuppner | 426/573 |
| 3,917,875 | 11/1975 | Gardiner | 426/573 |
| 3,978,243 | 8/1976 | Pedersen | 426/575 |
| 4,169,854 | 10/1979 | Igoe | 426/573 |
| 4,242,367 | 12/1980 | Igoe | 426/575 |
| 4,282,262 | 8/1981 | Blake | 426/575 |

*Primary Examiner*—Jeanette M. Hunter
*Attorney, Agent, or Firm*—Joyce P. Hill; Joseph T. Harcarik; Daniel J. Donovan

[57] ABSTRACT

A UHT processed physically stable milk composition comprising the following by weight:

| | |
|---|---|
| Milk | 80–94.1% |
| Sugar | 5–10% |
| Dried Fat Emulsion | 0–10% |
| Modified Starch | 0.5–3% |
| Iota-carrageenan | 0.15–0.5% |
| Xantham gum | 0.0–0.5% | and either 0–0.2% locust bean gum or 0–0.2% guar gum and 0–0.5% gelatin, and optionally flavoring, coloring and sweeteners the minimum proportion of gum blend being 0.1%.

7 Claims, No Drawings

GELLED MILK COMPOSITIONS

TECHNICAL FIELD

This invention relates to gelled milk compositions, such as gelled milk desserts.

BACKGROUND ART

So-called "instant" milk pudding powders have long been available for the preparation of puddings by stirring powder into the milk. Such powders generally contain pregelatinized starch, sugar, gelling agent, and flavouring and colouring.

Although these instant products are popular there has been an increasing market for ready-to-eat milk puddings, either chilled or refrigerated. Vegetable and/or microbial gums, together with carrageenan, have been employed as gelling agents for this category of products. Such gums and carrageenan are well known and are described in the literature, for instance in the "Handbook of Food Additives" published by the Chemical Rubber Company.

British Patent Specification Nos. 1220696 and 1220838 disclose essentially a thickening system, but also containing carrageenan and locust bean gum in small quantities. U.S. Pat. No. 4,242,367 discloses the use of a particular composition of guar gum, xanthan gum, carrageenan and locust bean gum as a stabilizing agent for milk shakes and soft frozen desserts, which remain stable for about ten days.

Heretofore gelled milk compositions, such as those referred to above, have suffered from the disadvantage that they have a limited shelf-life, even if sterile and stored under refrigeration, due to undesirable syneresis (the separation of liquid) and changes in texture. Such compositions are inconvenient to distributors and retailers as well as to the housewife since they require refrigeration and/or have a short "sell by" date.

The present invention, therefore, sets out to provide a shelf-stable, ready to eat, gelled milk composition which combines the convenience of previous gelled milk compositions with a longer shelf-life more characteristic of sterilized milk products.

DISCLOSURE OF THE INVENTION

According to the present invention there is provided a UHT processed physically stable gelled milk composition comprising the following by weight:

| Milk | 80–94.1% |
|---|---|
| Sugar | 5–10% |
| Dried Fat emulsion | 0–10% |
| Modified Starch | 0.5–3% |
| Iota-carrageenan | 0.15–0.5% |
| Xanthan gum | 0–0.5% | and either 0–0.2% locust bean gum or 0–0.2% guar gum and 0–0.5% gelatin, and optionally flavoring, coloring and sweeteners the minimum proportion of gum blend being 0.1%.

The preferred modified starch is modified waxy maize starch. Carrageenans, other than iota-carrageenan, such as kappa-carrageenan, cannot be effectively used in the composition of this invention. The combination of gums and carrageenan provides the required gel structure and water-binding capacity, in the UHT product. By "milk" is meant liquid milk, preferably pasteurized milk, but skim milk may also be used, or skim milk concentration. The preferred sugar is sucrose, but other carbohydrate materials, such as corn syrup solids may also be used.

The composition may be prepared by blending the powder ingredients and dispersing them in whole pasteurized milk. The dispersion is then homogenized, UHT processed and aseptically packed in sealed plastic laminated containers having good barrier properties against light, moisture and oxygen, or other suitable containers, such as cans in conventional manner. The composition is desirably cooled to 20° C. before packing, and during cooling may be aerated by injection of oxygen-free nitrogen. The finished products set as a relatively stiff gel. The UHT processing of the composition, and particularly of the modified starch therein, provides stability and the desired texture. The fat also contributes to thickening.

The product has stability against physical changes (e.g., free of syneresis and changes that would otherwise result from micro-organisms), so that a shelf-life of some six months at a temperature of 20° C. or less is provided.

The invention is illustrated by the following examples in which the proportions are given in percentages by weight.

EXAMPLE A

| Milk | 82.2% |
|---|---|
| Pulverized Sugar | 9.0% |
| Spray dried fat Emulsion | 7.4 |
| Modified waxy-maize Starch (E 1442) | 1.0 |
| Iota-carrageenan | 0.20 |
| Xanthan gum | 0.10 |
| Locust Bean Gum | 0.10 |
| | 100.00% |

Conventional coloring and flavoring may be added to provide a composition comprising, in one embodiment 0.004% coloring flavoring.

EXAMPLE B

| Milk | 82.2% |
|---|---|
| Pulverized Sugar | 8.85 |
| Spray Dried Fat Emulsion | 7.30 |
| Modified waxy-maize Starch (E 1442) | 1.00 |
| Iota-Carrageenan | 0.30 |
| Xanthan gum | 0.05 |
| Guar Gum (high viscosity) | 0.05 |
| Gelatin | 0.25 |
| | 100.00% |

Conventional coloring and flavoring may be added to provide a composition comprising, in one embodiment, 0.004% coloring and 0.048% flavoring.

I claim:

1. A UHT processed physically stable gelled milk composition comprising the following by weight:

| Milk | 80–94.1% |
|---|---|
| Sugar | 5–10% |
| Dried Fat Emulsion | 0.0–10% |
| Modified Starch | 0.5–3% |
| Gum Blend | |
| Iota-carrageenan | 0.15–0.5% |

| | |
|---|---|
| -continued | |
| Xanthan gum | 0.0–0.5% | herein the gum blend further comprises a component selected from the group locust bean gum, 0.0–0.2% and guar gum 0.0–0.2%, with gelatin, 0.0–0.5% and said gum blend is at least 0.1%, by weight, of said composition.

2. A gelled milk composition as claimed in claim 1 wherein the modified starch is waxy-maize starch.

3. A gelled milk composition as claimed in claim 1 wherein the sugar is sucrose.

4. A gelled milk composition as claimed in claim 2 wherein the sugar is sucrose.

5. A method of making gelled milk composition as claimed in claim 1 wherein the ingredients other than milk are blended and then dispersed in the milk, and the dispersion is homogenized, UHT processed and aseptically packed in sealed containers.

6. A method of making gelled milk composition as claimed in claim 2 wherein the ingredients other than milk are blended and then dispersed in the milk, and the dispersion is homogenized, UHT processed and aseptically packed in sealed containers.

7. A composition according to claim 1 which further comprises: flavoring, coloring, and sweeteners.

* * * * *